J. R. HARBECK.
PROCESS OF MAKING PAPER WALLED VESSELS.
APPLICATION FILED OCT. 18, 1912.
1,281,356.
Patented Oct. 15, 1918.
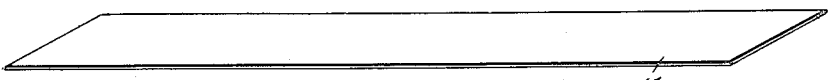
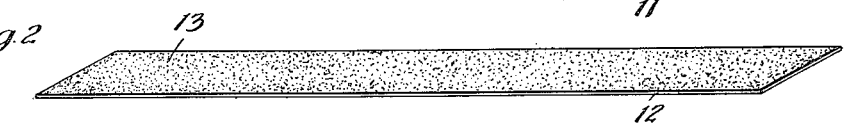
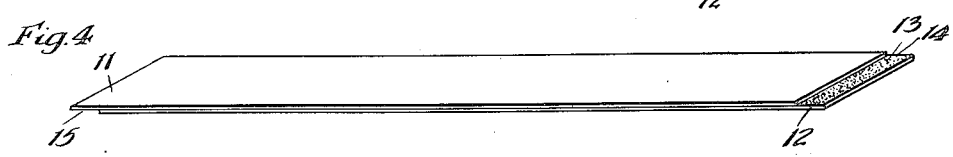
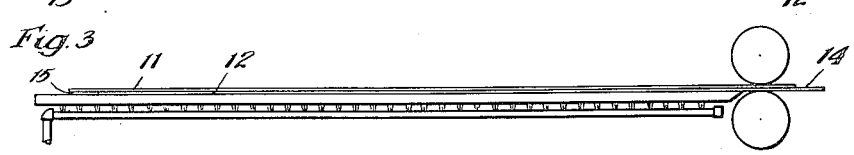
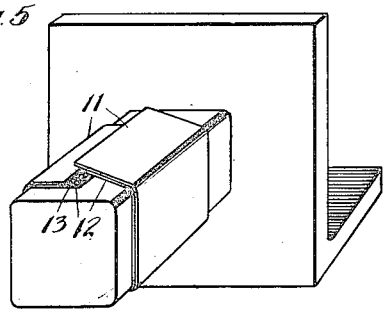
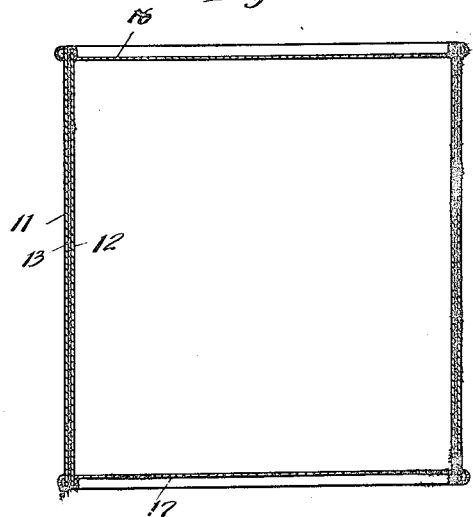
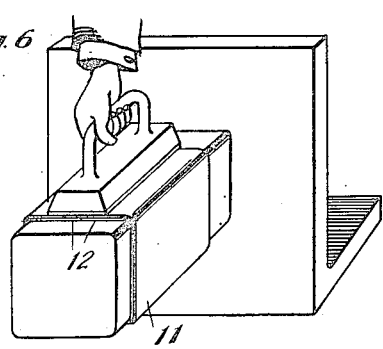
Witnesses:
Wm. Geiger
Pearl Abrams
Inventor:
Jervis R. Harbeck
By Munday, Evarts, Adcock & Clarke
his Attys.

UNITED STATES PATENT OFFICE.

JERVIS R. HARBECK, OF CHICAGO, ILLINOIS, ASSIGNOR TO AMERICAN CAN COMPANY, OF NEW YORK, N. Y., A CORPORATION OF NEW JERSEY.

PROCESS OF MAKING PAPER-WALLED VESSELS.

1,281,356.  Specification of Letters Patent.  Patented Oct. 15, 1918.

Application filed October 18, 1912. Serial No. 726,437.

*To all whom it may concern:*

Be it known that I, JERVIS R. HARBECK, a citizen of the United States, residing in Chicago, in the county of Cook and State of Illinois, have invented a new and useful Improvement in Processes of Making Paper-Walled Vessels, of which the following is a specification.

This invention relates to an improved method of manufacturing the walls of vessels out of layers of paper cemented together the purpose being to make an impervious wall in a simple and expeditious manner.

The invention consists in coating the layer or layers of paper with a cement which is hard when cold and softened and rendered adhesive by heat, assembling said layers together to form a composite sheet, leaving stepped ends whereby the two ends of the sheet may be united firmly and imperviously together by the subsequent application of heat.

In the accompanying drawing forming a part of this specification, Figure 1 is a perspective view of a single sheet of paper, fiber board or similar material. Fig. 2 is a perspective view of a similar sheet, one surface of the latter being shown as coated with cement. Fig. 3 is a diagrammatic side elevation of a pair of heating and pressing rolls to illustrate the method of joining the two component sheets together by heat and pressure. Fig. 4 is a view of the completed composite sheet showing the stepped ends of the sheet and illustrating the fact that one of said stepped ends is coated with the fusible cement. Fig. 5 is a perspective view of the act of forming up a tube or vessel wall by joining the two ends of the sheet. Fig. 6 illustrates the act of applying heat and pressure to the joined ends of the fabric. Fig. 7 is a view of the completed vessel with sheet metal ends applied to the composite paper walls.

In the practice of this invention, I take strips of paper or any similar fibrous material suitable to be formed into the walls of vessels, and coating a surface or the surfaces thereof with a cement which is capable of being fused, I place several of said sheets together, leaving the end of each to project beyond the end of the other, step fashion, and unite them by the fusing of the cement. The component parts of the sheet having become firmly joined together, one of the stepped ends will be found coated with a cement which can be made adhesive by the application of heat, that is to say, by fusion. The two ends of the sheet are brought together at this stepped portion and heat is applied accompanied by pressure, whereby the cement is fused and the two ends joined, forming of the sheet a tube or vessel wall, after which the ends, which may consist of sheet metal, are applied to the vessel and secured thereto, preferably by crimping. In the said drawing, 11 and 12 are similar strips of cardboard, paper, fiberboard or other like material, cut into oblong form of sufficient width to correspond to the height of the can to be made, and of sufficient length to equal the circumference of the can. The face of one of the strips, say the strip 12, is coated with a cement 13, which may consist of any well known fusible material, as for example, asphaltum with or without other fusible components. This cement should possess the character of remaining hard at ordinary temperatures, but be capable of being softened and rendered adhesive by the application of heat. The strip 11 is laid upon the strip 12 in such manner as to leave a step 14, 15 at each end, step 14 being coated with the cement and the step 15 being uncoated. In this position heat and pressure are applied, as for example, by passing the strip between heated rolls, as shown at Fig. 3, whereby the two layers are made to adhere firmly to each other. The two stepped ends of the sheet are now brought together to overlap, as indicated in Fig. 5, and heat accompanied by pressure, as for example, indicated in Fig. 6, is applied to the stepped ends, causing them to adhere together as firmly as any other part. The tubular structure thus formed may be then converted into a can or vessel by the application of sheet metal ends 16, 17.

A peculiar advantage of manipulation in manufacture accompanies the use of the fusible cement, both as a means of joining the component layers forming the walls and as a means of joining the stepped ends, which peculiar advantage is the readiness with which the joining may be effected by the mere application of pressure and heat, and the quickness with which adhesion is completed or set, enabling the article to be rapidly manipulated and handled in manufacture, and in this respect differing entirely from the slower processes of manufacture, such as involve the use of cements containing solvents, which require to be dried out before the adhesion is complete and perfect. A further advantage accompanies this method of manufacture, due to the character of the product. The walls formed in this manner are impervious to aromas, greases and moisture and even will stand a very considerable heating before the adhesion gives way. Because of the first named quality, this process is one peculiarly adapted for rapid manufacture by the aid of automatic machines, and because of the second named quality, the product is adapted to a wide variety of uses to which it has been impossible to put the ordinary paper walled cans.

Where the term "paper" is used herein, any kind or sort of fibrous material is meant.

I claim:—

1. The herein described process of making impervious paper walled vessels, which consists in uniting layers of paper by the use of an interposed layer of impervious fused cement not containing a solvent, and with the application of heat, said cement being adhesive when so fused, and then forming said united layers into the walls of vessels.

2. The herein described process of making impervious paper walled vessels which consists in first applying a layer of impervious fusible cement over one surface of a sheet of paper, the layer being substantially coextensive with the surface of said sheet and the cement having the characteristics of remaining hard at ordinary temperatures and of being rendered soft and adhesive by heat; then and when the cement is in a hard condition applying another sheet of paper to the cement-covered surface of the first named sheet; and finally applying heat to temporarily fuse the cement and render it adhesive and applying pressure to unite the sheets, substantially as specified.

3. The herein described process of making impervious paper vessels, which consists in arranging oblong layers of paper step fashion, with an interposed thin layer or film of fusible and normally dry cement, the said layer of cement being of such nature and thickness as to render the united layers impervious; fusing the layer of cement and applying pressure and thereby uniting together the layers of paper with projecting stepped ends one of which is covered by said cement in its normally dry condition; shaping said united layers to form the vessel body, with said projecting ends lapping each other and applying heat and pressure to said ends and uniting them to form an impervious seam.

JERVIS R. HARBECK.

Witnesses:
 RALPH H. DRAKE,
 R. R. ADAMS.